(12) United States Patent
Hannessen

(10) Patent No.: US 11,891,249 B2
(45) Date of Patent: Feb. 6, 2024

(54) ORDER PICKING SYSTEM COMPRISING A PATERNOSTER CONVEYOR AND METHOD OF USING SUCH A SYSTEM

(71) Applicant: QIMAROX PATENTEN B.V., Harderwijk (NL)

(72) Inventor: Pieter Gerrit Hannessen, Harderwijk (NL)

(73) Assignee: QIMAROX PATENTEN B.V., Harderwijk (NL)

(*) Notice: Subject to any disclaimer, the term of this patent is extended or adjusted under 35 U.S.C. 154(b) by 366 days.

(21) Appl. No.: 17/430,431

(22) PCT Filed: Mar. 11, 2020

(86) PCT No.: PCT/NL2020/050160
§ 371 (c)(1),
(2) Date: Aug. 12, 2021

(87) PCT Pub. No.: WO2020/185081
PCT Pub. Date: Sep. 17, 2020

(65) Prior Publication Data
US 2022/0212871 A1    Jul. 7, 2022

(30) Foreign Application Priority Data

Mar. 12, 2019  (NL) ..................................... 2022727
Sep. 4, 2019  (NL) ..................................... 2023760

(51) Int. Cl.
*B65G 1/137* (2006.01)
*B65G 47/71* (2006.01)
*B65G 47/40* (2006.01)

(52) U.S. Cl.
CPC ........... *B65G 1/1376* (2013.01); *B65G 47/71* (2013.01); *B65G 47/40* (2013.01); *B65G 2201/025* (2013.01); *B65G 2209/04* (2013.01)

(58) Field of Classification Search
CPC ...... B65G 1/1376; B65G 47/71; B65G 47/40; B65G 2201/025; B65G 2209/04
See application file for complete search history.

(56) References Cited

U.S. PATENT DOCUMENTS

2009/0010741 A1* 1/2009 Burgstaller .......... B65G 1/1378
                                                      414/800
2010/0316470 A1* 12/2010 Lert ..................... B65G 1/0492
                                                      414/807

(Continued)

FOREIGN PATENT DOCUMENTS

CH        539578 A    7/1973
CN    202594275 U    12/2012
(Continued)

OTHER PUBLICATIONS

International Search Report and Written Opinion for the International Patent Application No. PCT/NL2020/050160, dated Jun. 16, 2020, 32 pages.

*Primary Examiner* — Kyle O Logan
(74) *Attorney, Agent, or Firm* — KDW Firm PLLC

(57) ABSTRACT

An order picking system includes a paternoster conveyor having a carrier configured to carry products. The paternoster conveyor is on one side associated with at least one transporter; and on an opposite side associated with at least a plurality of further transporters that comprise a plurality of transport boxes. The plurality of transport boxes are configured to receive one or more than one product carried by the carrier. The paternoster conveyor is configured to at least one of: selectively place one or more than one product in a pre-selected transport box of the plurality of transport boxes; and selectively pick up and carry a pre-selected transport box comprising one or more than one product previously received therein. A method of handling products in such an order picking system.

17 Claims, 15 Drawing Sheets

(56) References Cited

U.S. PATENT DOCUMENTS

| | | | | |
|---|---|---|---|---|
| 2012/0101627 A1* | 4/2012 | Lert | ................ | B65G 1/1373 |
| | | | | 700/216 |
| 2016/0355337 A1* | 12/2016 | Lert | ................ | B65G 1/0478 |
| 2018/0009605 A1 | 1/2018 | Collin et al. | | |
| 2018/0215541 A1* | 8/2018 | Belardinelli | ........... | B65G 17/34 |
| 2022/0133933 A1* | 5/2022 | Mazursky | ............... | A61L 2/26 |
| | | | | 422/33 |

FOREIGN PATENT DOCUMENTS

| | | |
|---|---|---|
| DE | 4300758 A1 | 7/1994 |
| EP | 2729387 A2 | 5/2014 |
| FR | 3031510 A1 | 7/2016 |
| JP | H1053325 A | 2/1998 |
| JP | 2018505108 A | 2/2018 |
| WO | 9534491 A1 | 12/1995 |

\* cited by examiner

ORDER PICKING SYSTEM COMPRISING A PATERNOSTER CONVEYOR AND METHOD OF USING SUCH A SYSTEM

This is a national stage application filed under 35 U.S.C. § 371 of pending international application PCT/NL2020/050160, filed Mar. 11, 2020, which claims priority to Netherlands Patent Application No. NL 2022727, filed Mar. 12, 2019, and also claims priority to Netherlands Patent Application No. NL 2023760, filed Sep. 4, 2019, the entirety of which applications are hereby incorporated by reference herein.

The present invention relates to an order picking system comprising a paternoster conveyor having a carrier configured to carry products. The invention is further related to a method of handling products in an order picking system comprising a paternoster conveyor.

EP 2 403 782 of Applicant describes a paternoster lift, i.e. a vertical conveyor, for transferring products from a first conveyor to a second conveyor. Using this vertical conveyor a height difference can be bridged between said two conveyors, while the order of the products remains unchanged. If products had to be sorted into different product streams, or if different supply streams of products had to be combined, additional dedicated devices were applied. For example, for sorting products, a sorting system such as a shoe sorter may be applied. Such shoe sorters are often used for applications where there is a wide variety of product sizes, shapes and weights, and are also suitable for handling products that are fragile or easily damaged. However, a major disadvantage of a shoe sorter is the huge footprint thereof.

FR 3 031 510 A1 discloses a system and method of sequencing for at least one preparation station (also called "picking station"), and is considered the closest prior art. It discloses a paternoster conveyor having a carrier configured to carry products, wherein said paternoster conveyor is on one side associated with at least one transporter, and on an opposite side associated with at least a plurality of further transporters that comprise a plurality of transport boxes. Such transport boxes may, and typically will, comprise products. The system is configured to sequence loads coming from at least one external unit (for example a storage warehouse), via at least one entry conveyor, and provide loads in a desired order via at least one exit conveyor to e.g. a picking station. The system in this document prepares a sequence for an order picking station, after which human operator takes the boxes that are outputted for further handling in the order picking station. While the system itself is not an order picking system, it is still considered the closest prior art as it is at least related to a preparation for order picking and may be connected to an order picking system arranged downstream thereof. At least the features according to the characterizing portion of the independent claims are novel relative to this document. A disadvantage of this closest prior art is that it may only be used for sorting pre-filled boxes, and consequently will require further systems, such as an upstream filling system for filling said boxes with products, and the aforementioned picking station downstream. The total footprint of these systems combined will be relatively large, and manual labor seems to be involved with at least the step of handling the boxes after they have been sequenced in the desired order. There is an ongoing need for versatile systems, having a high level of automation and preferably a small footprint.

The international patent application WO 95/34491 A1 discloses a four-chain paternoster cargo handling system that enables continuous handing of different heavy weight cargo, especially on ships and in ports. It discloses a paternoster conveyor having a carrier configured to carry products, wherein said paternoster conveyor is on one side associated with at least one transporter, and on an opposite side associated with at least a plurality of further transporters. The cargo comprises a plurality of boxes that may, and typically will, comprise products.

CH 539 578 A, EP 2 729 387 A2, CN 202 594 275 U, DE 43 00 758 A1 and JP H10 53325 A are acknowledged as further prior art.

An objective of the present invention is to provide an order picking system comprising a paternoster conveyor, that is improved relative to the prior art and wherein at least one of the above stated problems is obviated.

Said objective is achieved with the system according to the present invention, comprising:
  a paternoster conveyor having a carrier configured to carry products;
  wherein said paternoster conveyor is:
    on one side associated with at least one transporter; and
    on an opposite side associated with at least a plurality of further transporters that comprise a plurality of transport boxes,
  wherein the plurality of transport boxes are configured to receive one or more than one product carried by the carrier; and
  wherein the paternoster conveyor is configured to at least one of:
    selectively place one or more than one product in a pre-selected transport box of the plurality of transport boxes; and
    selectively pick up and carry a pre-selected transport box comprising one or more than one product previously received therein.

By combining a paternoster conveyor with a plurality of transporters, i.e. at least one transporter arranged at one side thereof, and at least a plurality of further transporters arranged at an opposite side thereof, a very versatile system is obtained. Similar to the paternoster lift of EP 2 403 782 described above, products may bridge a height difference between two transporters. However, due to the plurality of transporters, the system according to the invention is capable of simultaneously performing a sorting and/or combining action. The invention not only renders an additional dedicated device for sorting or combining products redundant, but also achieves the versatile sorting and/or combining action at a very limited footprint. Furthermore, relative to a horizontal sorter such as a shoe sorter, logistics is further improved because an intermediate step of receiving the products on a pallet and handling thereof may be redundant.

Whereas the prior art systems discussed above are only capable of sorting or storing pre-filled boxes (or cargo), the order picking system according to the invention is able to carry products by said carrier independently of the boxes, thereby allowing the order picking system to also place products that are carried by the carrier into a pre-selected one of the plurality of transport boxes. The transport boxes are configured to receive one or more than one product carried by the carrier, contrary to the boxes according to the prior art that are only configured to be carried by the carrier, typically with products already inside said pre-filled box.

The paternoster conveyor is configured to at least one of: selectively place one or more than one product in a pre-selected transport box of the plurality of transport boxes, and selectively pick up and carry a pre-selected transport box comprising one or more than one product previously received therein. The order picking system according to the invention thus on the one hand may sort products, by transporting them with said carrier, and placing them into one of a plurality of boxes that are stored in said order picking system. On the other hand, the order picking system may also pick up a transport box that has been filled in advance by said same order picking system. Consequently, the order picking system according to the invention is highly versatile, combining at least the functionality of filling transport boxes with pre-selected products, as well as the functionality of storing and sorting said filled transport boxes, and this all at a very limited footprint.

Said objective is also achieved with a method of handling products in an order picking system comprising at least one transporter on one side of a paternoster conveyor and at least a plurality of further transporters on an opposite side thereof, the method comprising the steps of:
 accepting products from one of the at least one transporter or at least one of the plurality of further transporters;
 conveying the products to the other side of the paternoster conveyor;
 depositing the products to at least one of the plurality of further transporters or one of the at least one transporter on the other side of the paternoster conveyor;
 wherein the plurality of further transporters comprises a plurality of transport boxes that are configured to receive one or more than one product carried by the carrier, and said method comprises the step of selectively placing one or more than one product in a pre-selected transport box of the plurality of transport boxes; and
 further comprising the step of said paternoster conveyor selectively picking up and carrying a pre-selected transport box comprising one or more than one product previously received therein.

Preferred embodiments are the subject of the dependent claims.

The various aspects and features described and shown in the specification can be applied, individually, wherever possible. These individual aspects, and in particular the aspects and features described in the attached dependent claims, may be made subject of divisional patent applications related to a different problem relative to the prior art for which the transporters may not comprise a plurality of transport boxes.

In the following description preferred embodiments of the present invention are further elucidated with reference to the drawing, in which.

Figure 1:
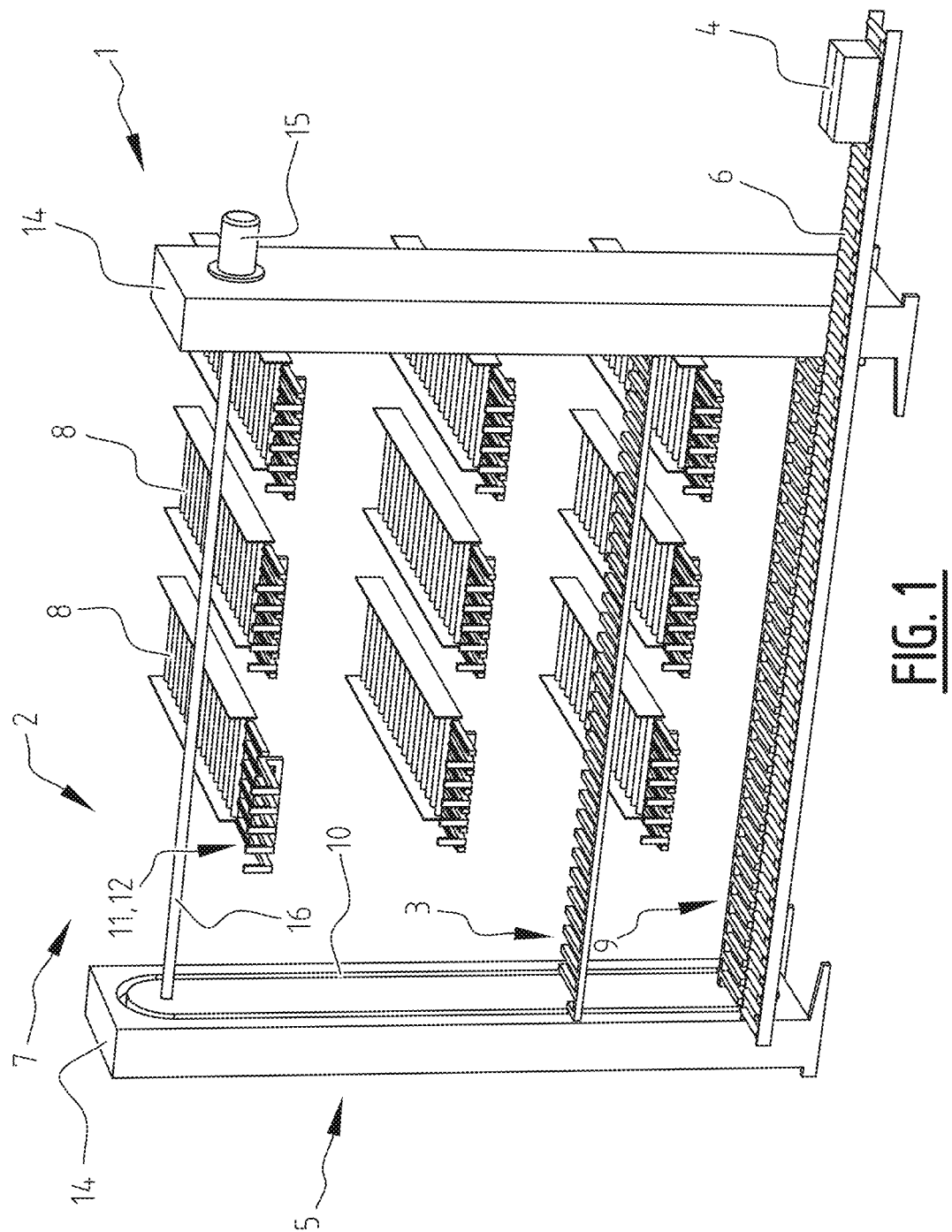
FIG. 1 is a perspective view of system according to the invention.

The system 1 shown in FIG. 1 comprises a paternoster conveyor 2 having a carrier 3 configured to carry products 4. For reasons of simplicity only one carrier 3 is shown in FIGS. 1-6, but the skilled person will understand that multiple carriers 3 may be used (as shown in the embodiment of FIG. 7), wherein the number of carriers 3 is directly related to the capacity of the system.

The paternoster conveyor 2 is on one side 5 associated with at least one transporter 6, while said paternoster conveyor 2 is on an opposite side 7 associated with at least a plurality of further transporters 8. The one side 5 and the opposite side 7 are arranged on opposite sides relative to the paternoster conveyor 2 that is thus arranged in between said one side 5 and the opposite side 7.

For reasons of simplicity, in the embodiment of FIGS. 1-6, there is arranged only one transporter 6 on the one side 5 of the paternoster conveyor 2, while there are a total of nine further transporters 8 arranged on the opposite side 7. In the shown embodiment, the one transporter 6 functions as an input transporter, and the plurality of further transporters 8 function as output transporters. Thus, the shown embodiment may be applied as a sorting system, wherein products that are supplied via transporter 6 may be selectively deposited on a selected one of the plurality of further transporters 8, that function as an output.

The carrier 3 of the paternoster conveyor 2 is configured to be driveable in an endless path 10 to selectively: accept products 4 from one of the at least one transporter 6 or at least one of the plurality of further transporters 8, and deposit said products 4 on at least one of the plurality of further transporters 8 or one of the at least one transporter 6 on the other side of the paternoster conveyor 2.

Figure 2:
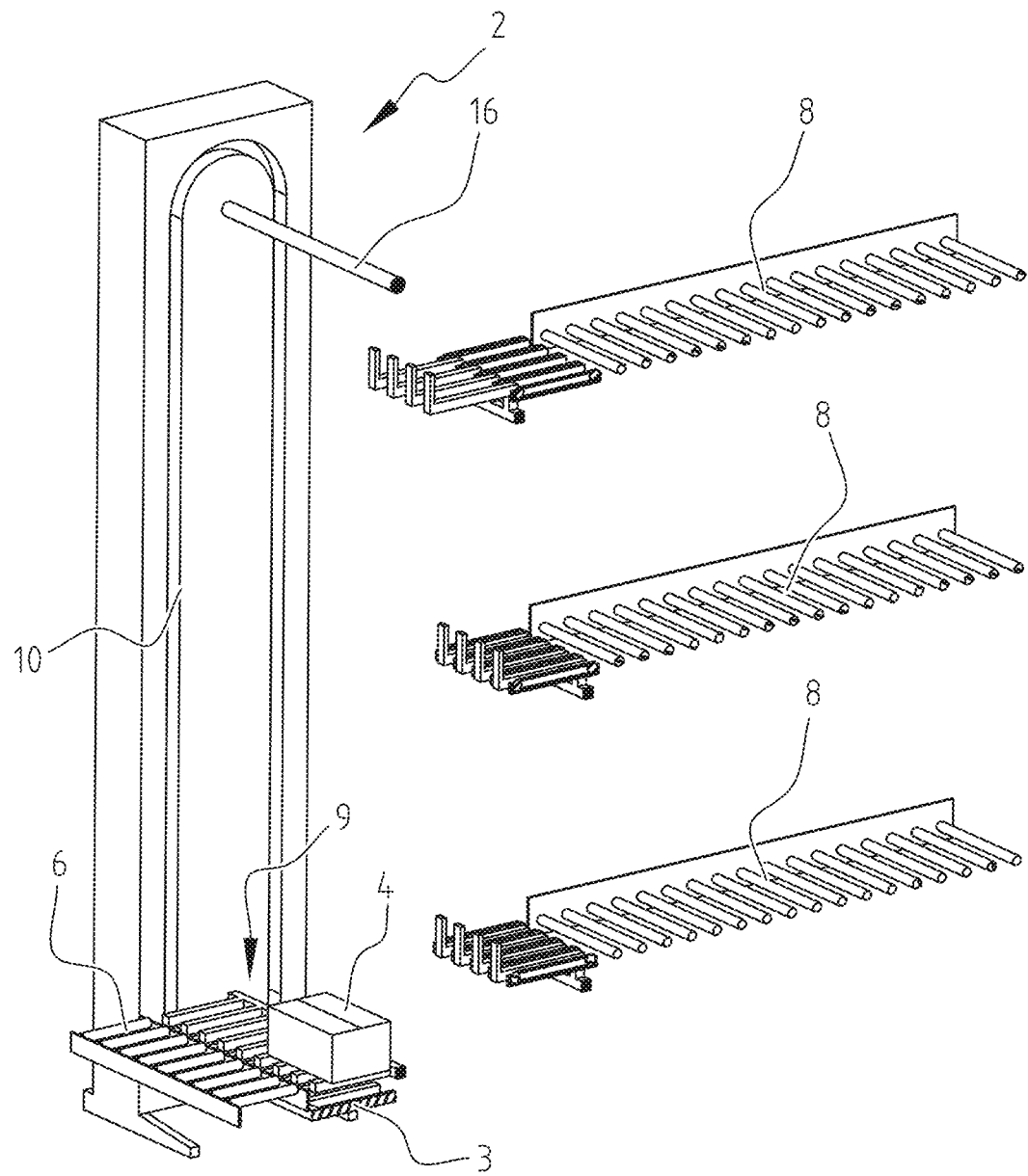
FIGS. 2-6 show perspective views of successive steps of using the system of FIG. 1.
Figure 3:
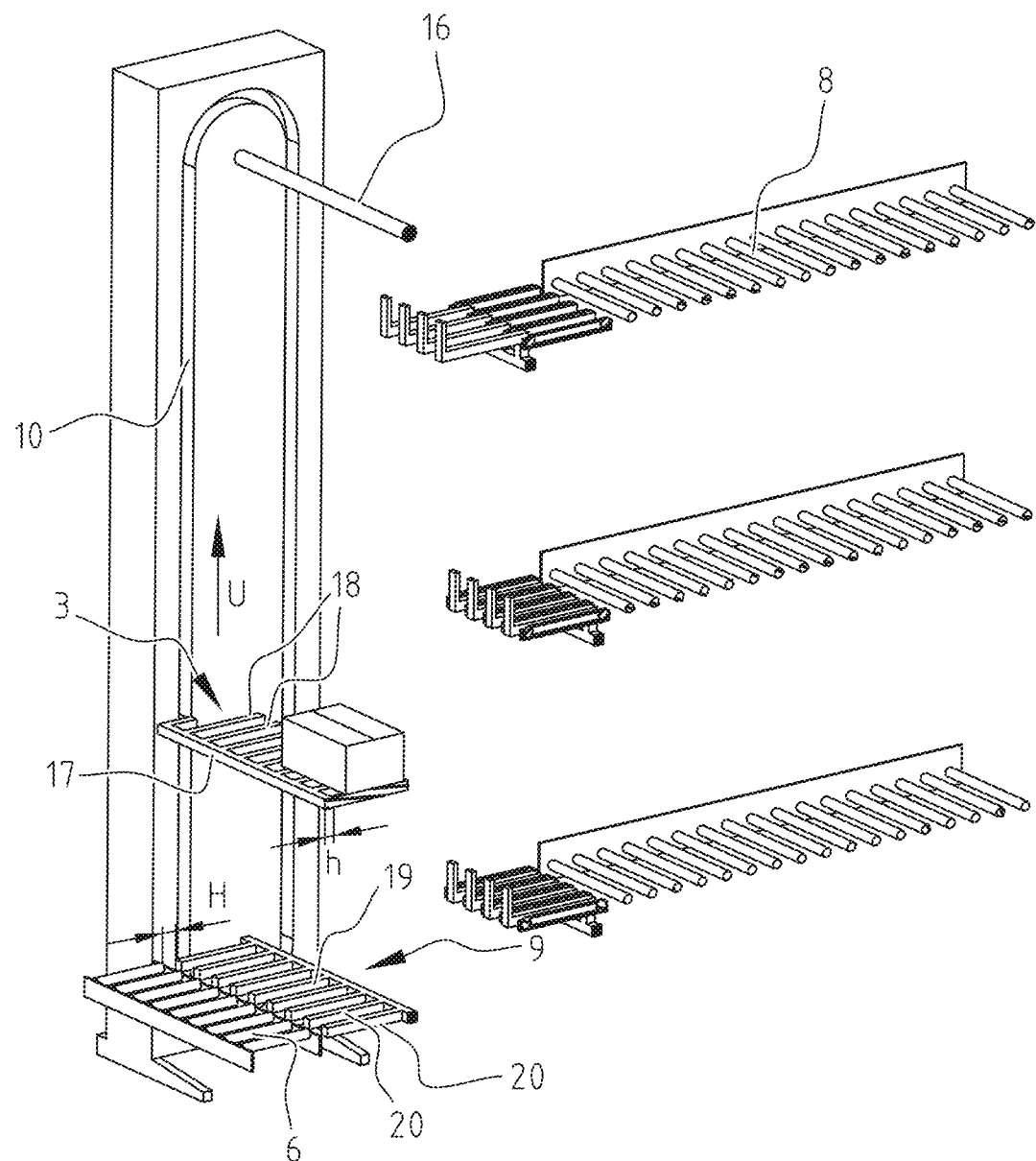

The carrier 3 is configured to accept products 4 by lifting up said products 4 from one of the at least one transporter 6 or at least one of the plurality of further transporters 8. FIG. 2 shows a situation wherein the carrier 3 is positioned just below a platform 9 that supports a product 4 that has been supplied by transporter 6. Transporter 6 and platform 9 are arranged on a segment of the endless path 10 where the carrier 3 is driveable in an upward direction U (FIG. 3).

The carrier 3 is driveable in an endless path 10 that is oriented substantially upright, thereby lifting the product 4 up from the platform 9 when the carrier moves in an upward direction U (FIG. 3) on the one side 5 of the paternoster conveyor 2.

Figure 4:
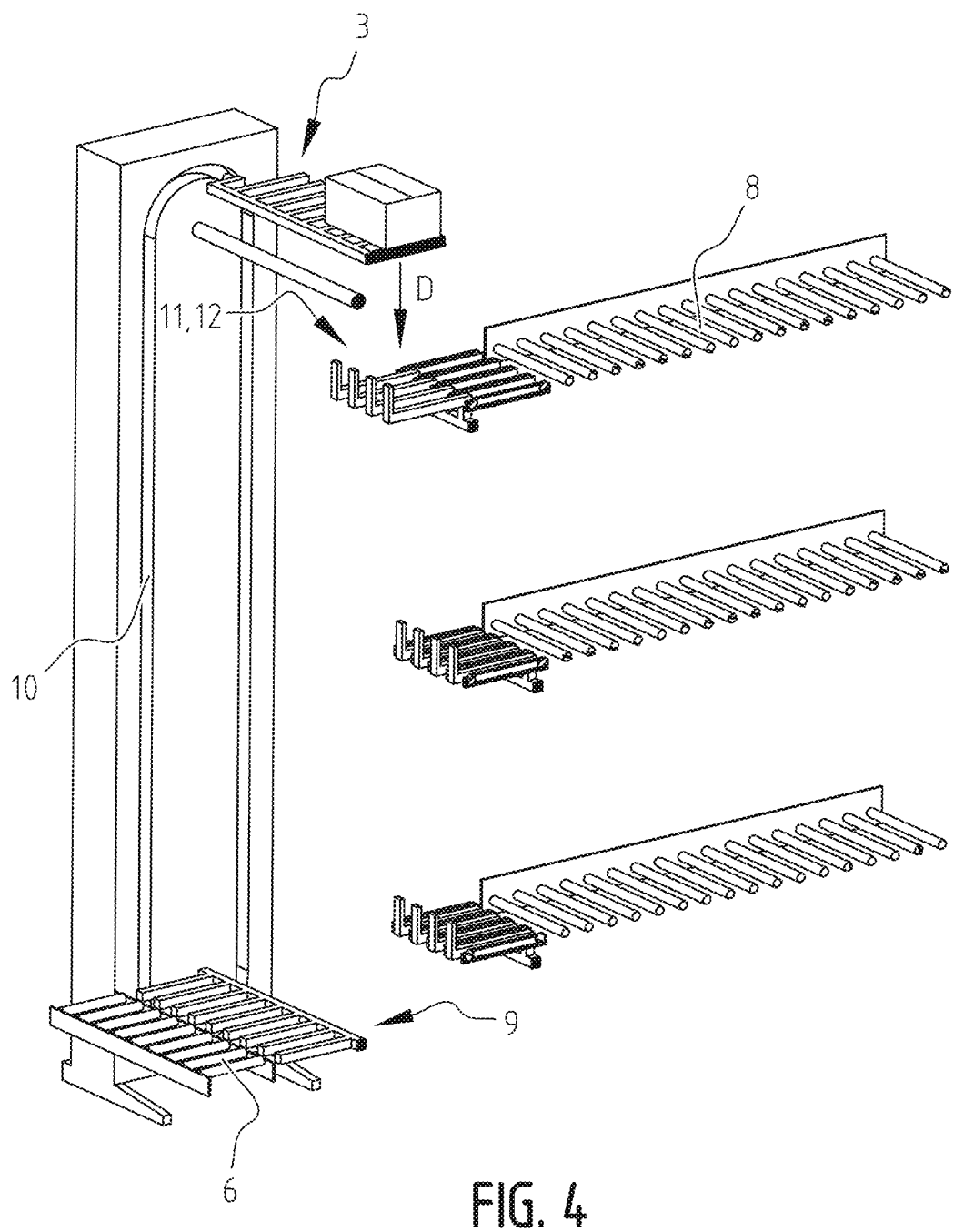

The carrier 3 is configured to deposit products 4 by setting down said products 4 on at least one of the plurality of further transporters 8 or on one of the at least one transporter 6 on the other side of the paternoster conveyor. In the shown embodiment, if the carrier 3 moves further along the endless path 10, it arrives at the opposite side 7, where it will move in a downward direction D (FIG. 4). The further transporters 8 are arranged on a segment of the endless path 10 where the carrier 3 is driveable in said downward direction D.

Figure 5:
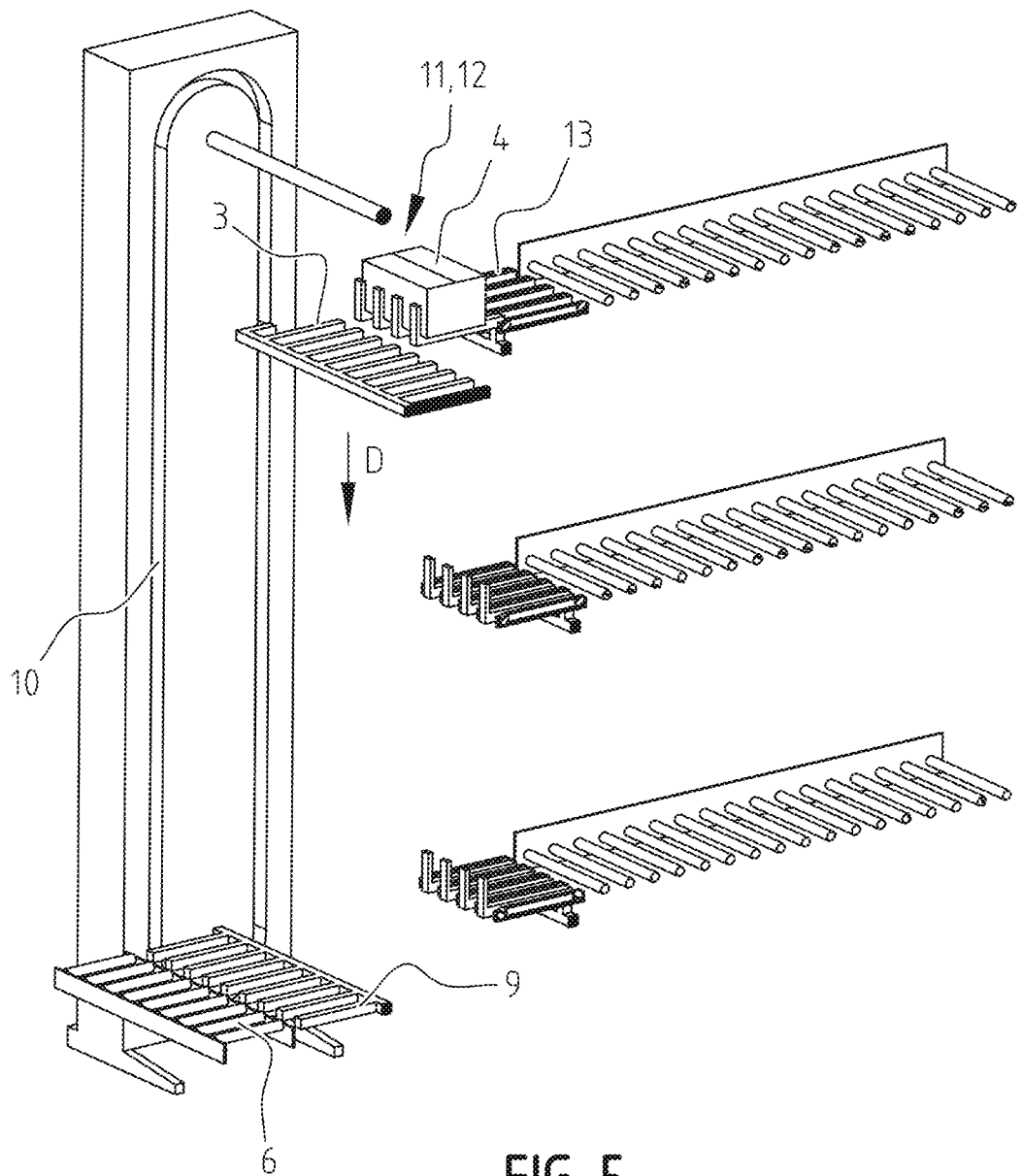
Figure 6:
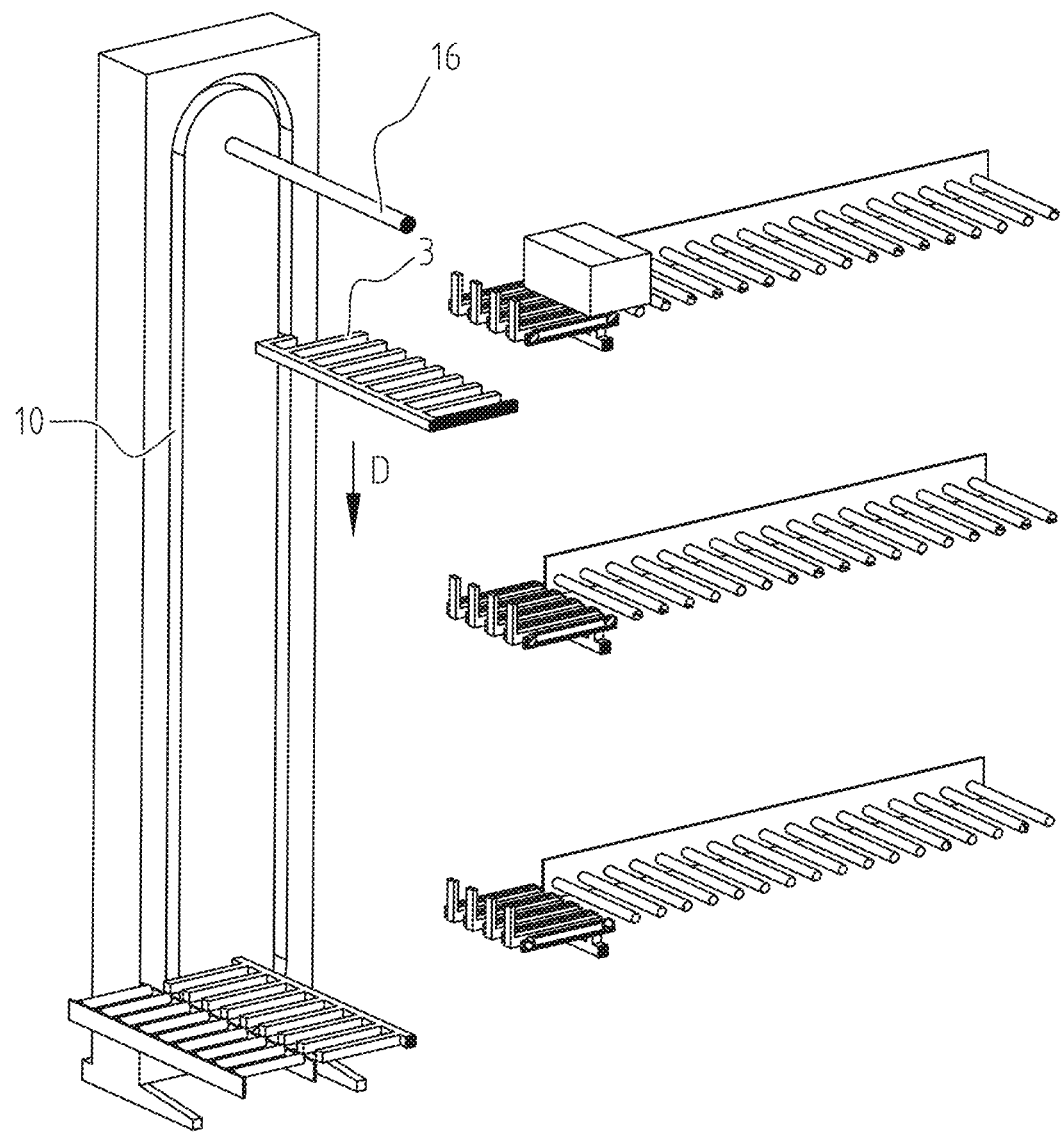
Figure 7:
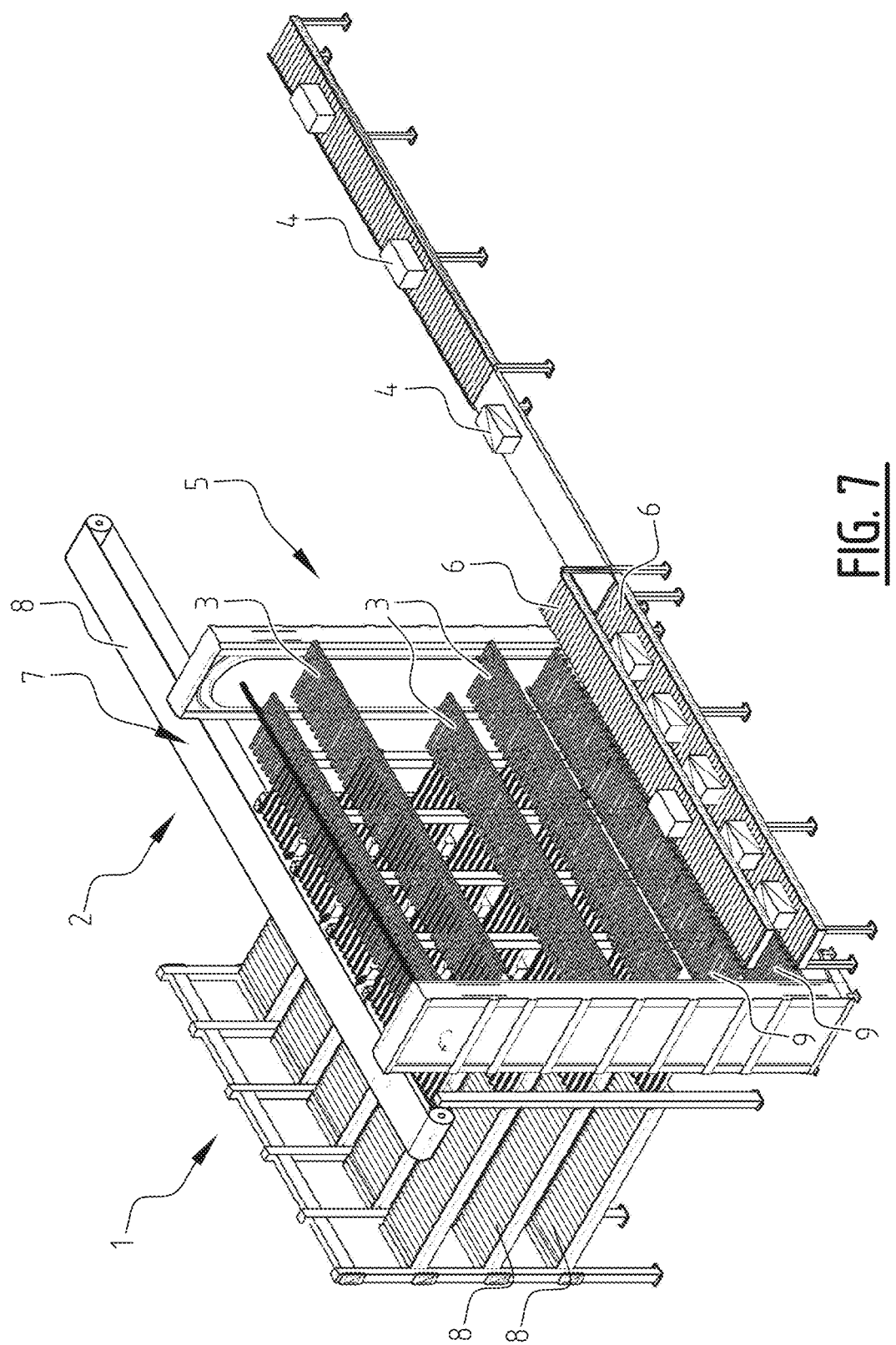
FIG. 7 is a perspective view of a second embodiment of system according to the invention.

FIGS. 5 and 6 show situations wherein the carrier 3 has displaced further in downward direction D, and has set down the product 4 on a further platform 11. In this example of the system 1 being a sorting system, the further platform 11 is a set down location 12. However, in a kinematic inversion resulting in a (not shown) combining system for products 4, said further platform 11 may be a pick up location.

In the specific embodiment shown, the further platform 11 is a platform that is extendable relative to the associated transporter 8 to allow for a selective depositing of products 4. In other words, the system 1 allows to selectively choose on which of the plurality of further transporters 8 on the opposite side 7 specific products 4 are received for further handling. The products 4 may be deposited, i.e. set down, on a further platform 11 of a further transporter 8.

In FIG. 5, the further platform 11 is fully extended, and has just received the deposited product 4. In FIG. 6, the further platform 11 is retracted, and the product 4 is being transported by a sub-transporter 13 onto further transporter 8.

Figure 8:
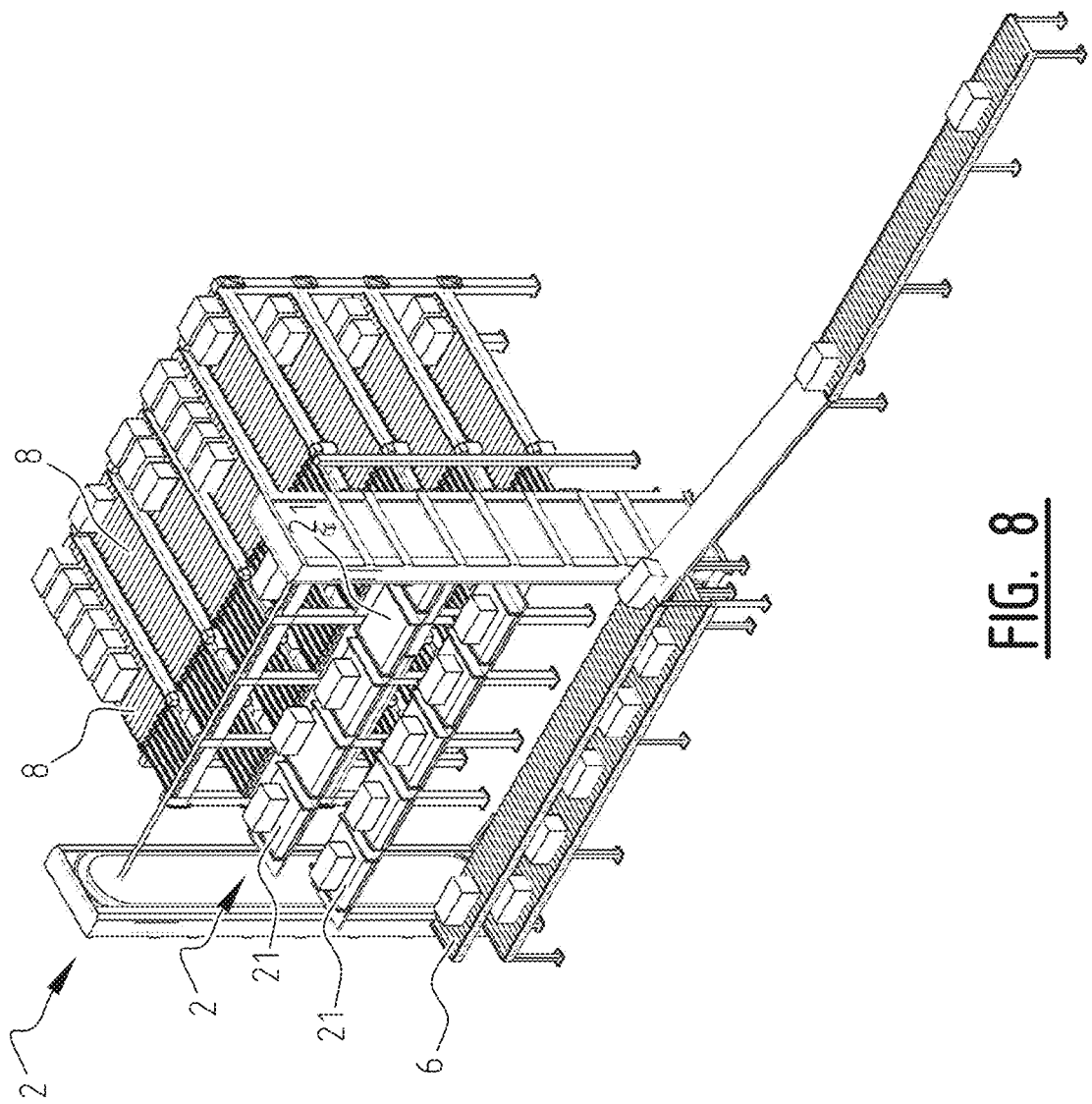
FIG. 8 is a perspective view of a third embodiment of a system, wherein the carrier comprises belt conveyors.
Figure 9:
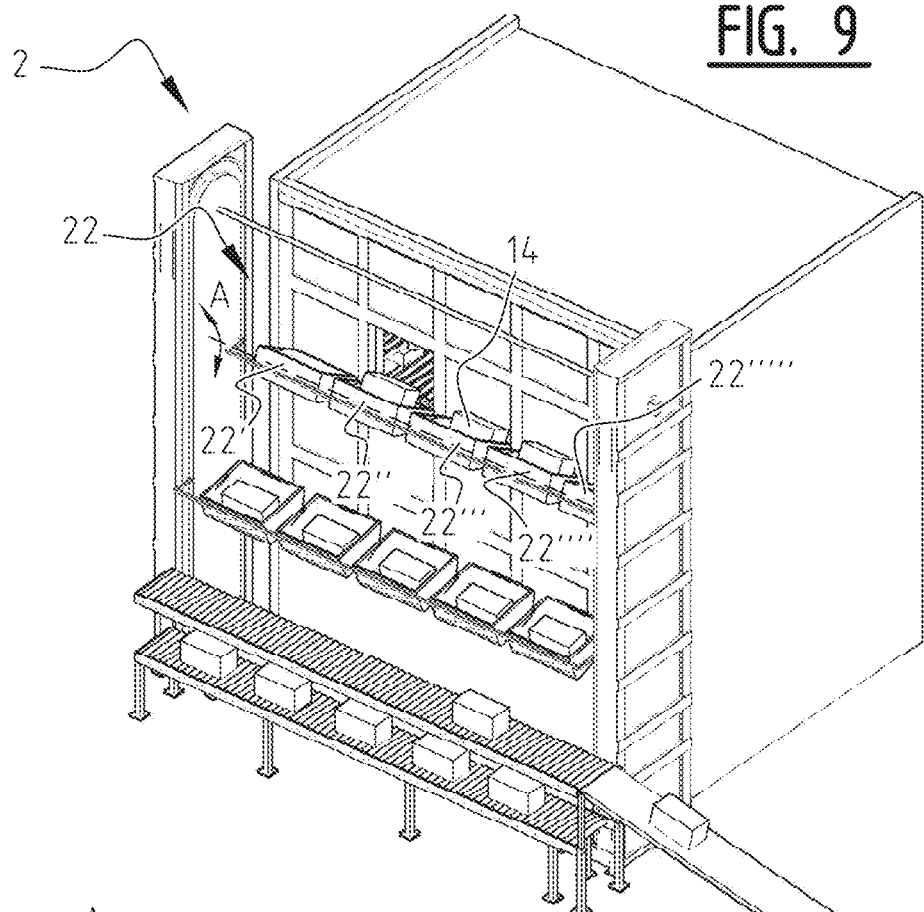
FIG. 9 is a perspective view of a fourth embodiment of a system, wherein the carrier is a tiltable receptacle.
Figure 9A:
FIG. 9A is a detailed view showing tilting of the receptacle.
Figure 10:
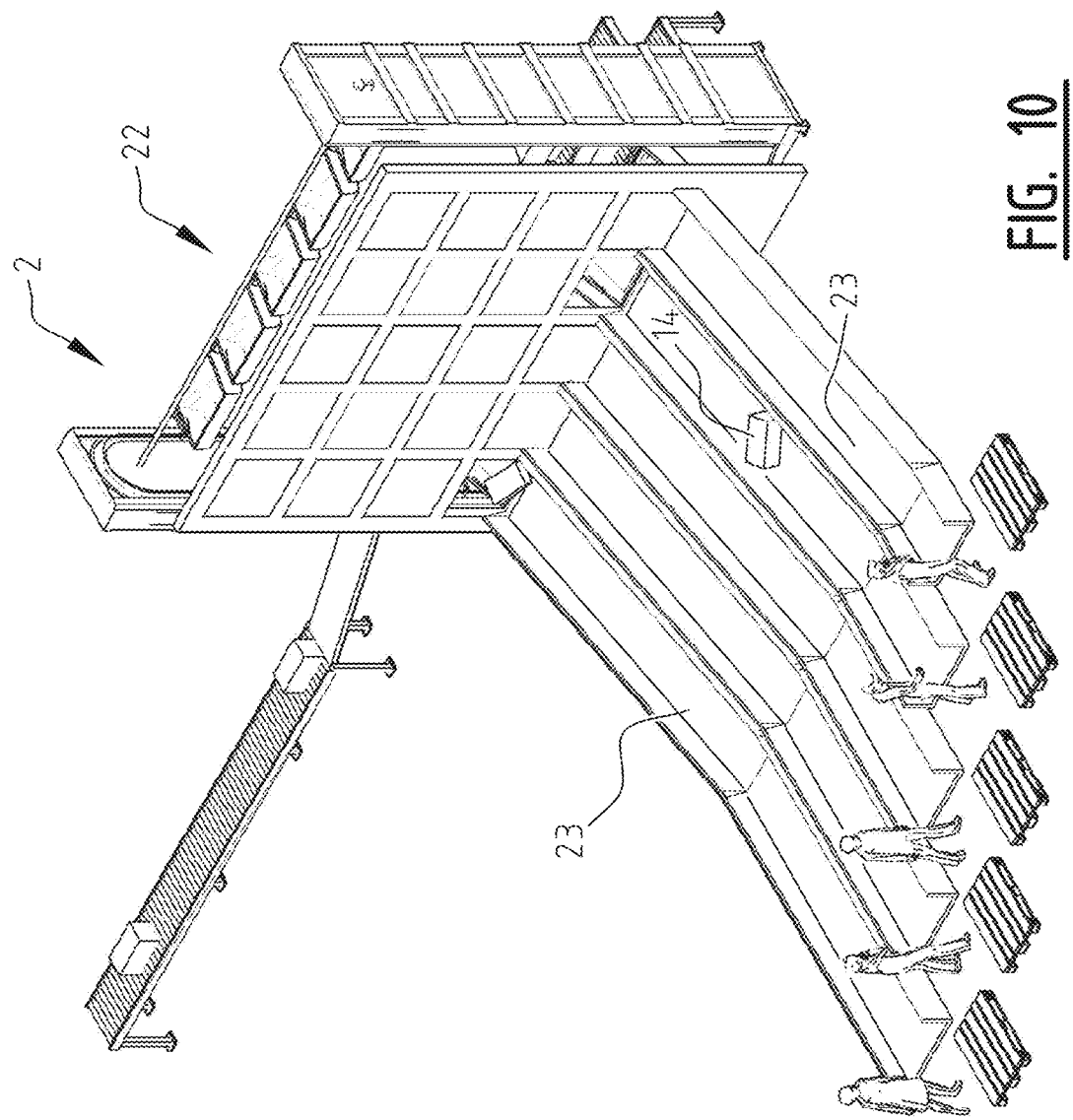
FIG. 10 is a perspective view of a fifth embodiment of a system, wherein the transporters comprise chutes.

As an alternative to the extendable platforms 11, carrier 3 may comprise one or more than one conveyor 21 (FIG. 8) or pusher that is configured to force the products 14 away from the carrier 3 onto a desired transporter 6 or further transporter 8. Alternatively, the carrier 3 may tilt (FIGS. 9 and 10) to release a product therefrom under influence of gravity, similar to the working principle of a dump truck. In FIGS. 9 and 10, the carrier 3 comprises a plurality of receptacles 22 that may tilt, preferably independently of each other. Due to the tilting, the receptacle 22 tips over and any product 14 therein may be released from said receptacle 22 onto a desired transporter 6 or further transporter 8.

In a preferred embodiment, the paternoster conveyor 2 comprises two opposite paternoster lifts 14, and the carrier 3 is a common carrier extending between said opposite paternoster lifts 14 (FIG. 1). The common carrier 3 may be supported on opposite ends thereof by the two paternoster lifts 14.

Each paternoster lift 14 may be a lift as described in EP 2 403 782 of Applicant. In a preferred embodiment, both paternoster lifts 14 are synchronized, which may be obtained if they have a common drive motor 15 and drive axis 16.

If the carrier 3 is an elongate carrier, it may carry a plurality of products 4 simultaneously.

The carrier 3 may have a comb shape comprising a base 17 and a plurality of teeth 18.

If the common carrier 3 is supported on opposite ends thereof by the two paternoster lifts 14, the base 17 of the comb shaped carrier 3 extends between the opposite paternoster lifts 14. The teeth 18 extend transverse thereto.

Platform 9 is arranged between the paternoster conveyor 2 and at least one of the at least one transporter 6 on the one side 5 or at least one of the plurality of further transporters 8 on the opposite side 7 thereof. In the shown embodiment, platform 9 is arranged on the one side 5 and configured to receive objects 4 from transporter 6.

Platform 9 has a comb shape that is complementary to the comb shape of the carrier 3. The comb shape of the platform 9 comprises a platform base 19 and a plurality of platform teeth 20, wherein the platform teeth 20 extend from the platform base 19 towards the at least one transporter 6 or at least one of the plurality of further transporters 8 on the respective side of the paternoster conveyor 2. In the shown embodiment, the platform 9 is arranged on the one side 5 of the paternoster conveyor 2, and hence the platform teeth 20 extend towards the transporter 6 of that same one side 5 of the paternoster conveyor 2.

Platform 9 and the at least one transporter 6 or the at least one of the plurality of further transporters 8 on that respective side 5, 7 of the paternoster conveyor 2 are arranged at a horizontal offset H that is larger than a horizontal dimension h of the base 17 of the comb shaped carrier 3 (FIG. 3). The base 17 of the comb shaped carrier 3 is configured to travel through the horizontal offset H.

The invention further relates to a method of conveying products 4 in a system 1 comprising at least one transporter 6 on one side 5 of a paternoster conveyor 2 and at least a plurality of further transporters 8 on an opposite side 7 thereof, the method comprising the steps of:

accepting products 4 from one of the at least one transporter 6 or at least one of the plurality of further transporters 8;

conveying the products 4 to the other side of the paternoster conveyor 2; and depositing the products 4 to at least one of the plurality of further transporters 8 or one of the at least one transporter 6 on the other side of the paternoster conveyor 2.

The step of accepting products 4 from one of the at least one transporter 6 or at least one of the plurality of further transporters 8 may comprise the step of lifting up said products 4 from one of the at least one transporter 6 (FIGS. 2 to 3) or at least one of the plurality of further transporters 8.

The step of depositing the products 4 to at least one of the plurality of further transporters 8 or one of the at least one transporter 6 on the other side of the paternoster conveyor 2 may comprise the step of setting down said products 4 on at least one of the plurality of further transporters 8 (FIGS. 4 to 5) or one of the at least one transporter 6 on the other side of the paternoster conveyor 2.

The step of accepting products 4 from one of the at least one transporter 6 or at least one of the plurality of further transporters 8 comprises the step of selectively accepting products 4. In this way, the system 1 may be used for selectively combining products 4 in a combining system with a very small footprint.

The step of depositing the products 4 to at least one of the plurality of further transporters 8 or one of the at least one transporter 6 on the other side of the paternoster conveyor 2 comprises the step of selectively depositing products 4. In this way, the system 1 may be used for sorting products 4. Relative to a shoe sorter system according to the prior art, the foot print is very small, whereas it shares the advantages of being suitable for applications where there is a wide variety of product sizes, shapes and weights, and wherein products 4 may be fragile or easily damaged.

If a product 4 is rejected or for some other reason not yet deposited, said product 4 is always deposited on a lowermost transporter 6 or further transporter 8 to prevent clogging of the system 1. After a check, said by-passed product 4 may be fed into the system 1 again for further handling thereof.

FIG. 7 shows a further embodiment according to the invention, wherein multiple carriers 3 are applied. Moreover, a plurality of transporters 6, 8 is arranged on both sides of the paternoster conveyor 2. Although not shown, it is conceivable that transporters 6, 8 extend in different directions. In the case of an input transporter 6, the platform 9 may be fed with products 4 from different directions, thereby increasing input speed.

In FIG. 7, the flow direction is deliberately not shown, meaning that the transporters 6 on the one side 5 may be input transporters, and the transporters 8 on the opposite side 7 may be output transporters (as in the example above), or vice versa. A kinematic inversion results in the transporters 8 on the opposite side 7 functioning as input transporters, and the transporters 6 on the one side of the paternoster conveyor 2 functioning as output transporters.

Moreover, the transporters 6, 8 may extend parallel to the paternoster conveyor 2 or transverse thereto. In FIG. 7, an upper one of the plurality of further transporters 8 on the opposite side 7 of the paternoster conveyor 2 is extending parallel to the paternoster conveyor 2, and transverse relative to the other further transporters 8.

Figure 15:
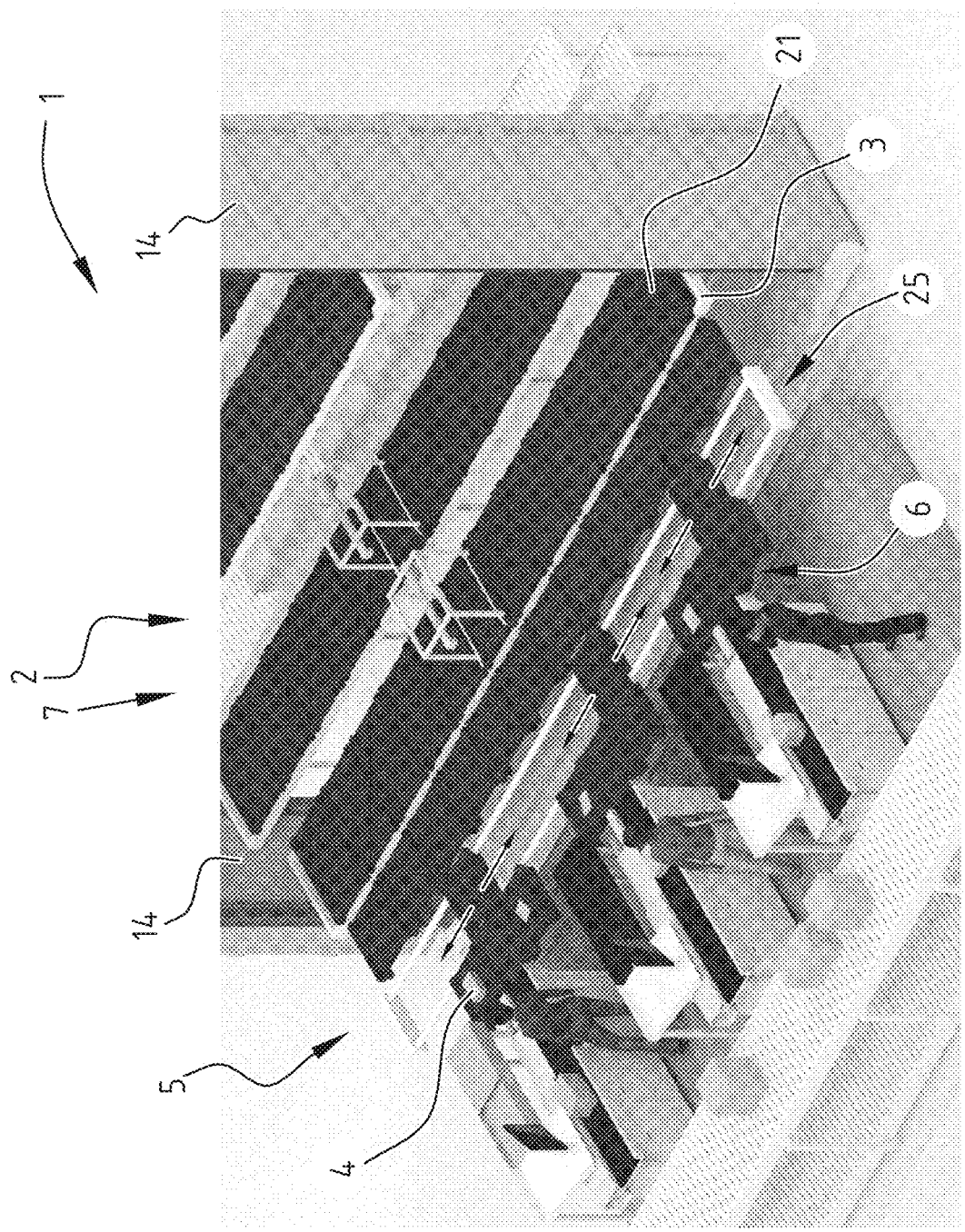
FIG. 15 shows perspective view of a seventh embodiment of a system according to the invention that is closely related to the sixth embodiment.

A sixth preferred embodiment of a system 1 according to the invention is shown in FIGS. 11-14, which show successive steps of said system 1 during use, while a seventh preferred embodiment is shown in FIG. 15. Because of the close relationship between the sixth and seventh embodiment, they are now described simultaneously.

As in the previous embodiments, the system 1 of the sixth and seventh embodiment again comprises a paternoster conveyor 2 having a carrier 3 configured to carry products 4. The carrier 3 is arranged between two paternoster lifts 14.

The paternoster conveyor 2 is on one side 5 associated with at least one transporter 6, i.e. three transporters 6 in the shown embodiment. Said paternoster conveyor 2 is on an opposite side 7 associated with at least a plurality of further transporters 8. In the sixth and seventh embodiment said plurality of further transporters 8 comprise a plurality of transport boxes 24 that are configured to receive one or more than one product 4 carried by the carrier 3. By using transport boxes 24, the versatility of the system 1 increases, wherein the system 1 is now able to store, sort and distribute products 4 effectively.

The one side 5 and the opposite side 7 are arranged on opposite sides relative to the paternoster conveyor 2 that is thus arranged in between said one side 5 and the opposite side 7.

Figure 13:
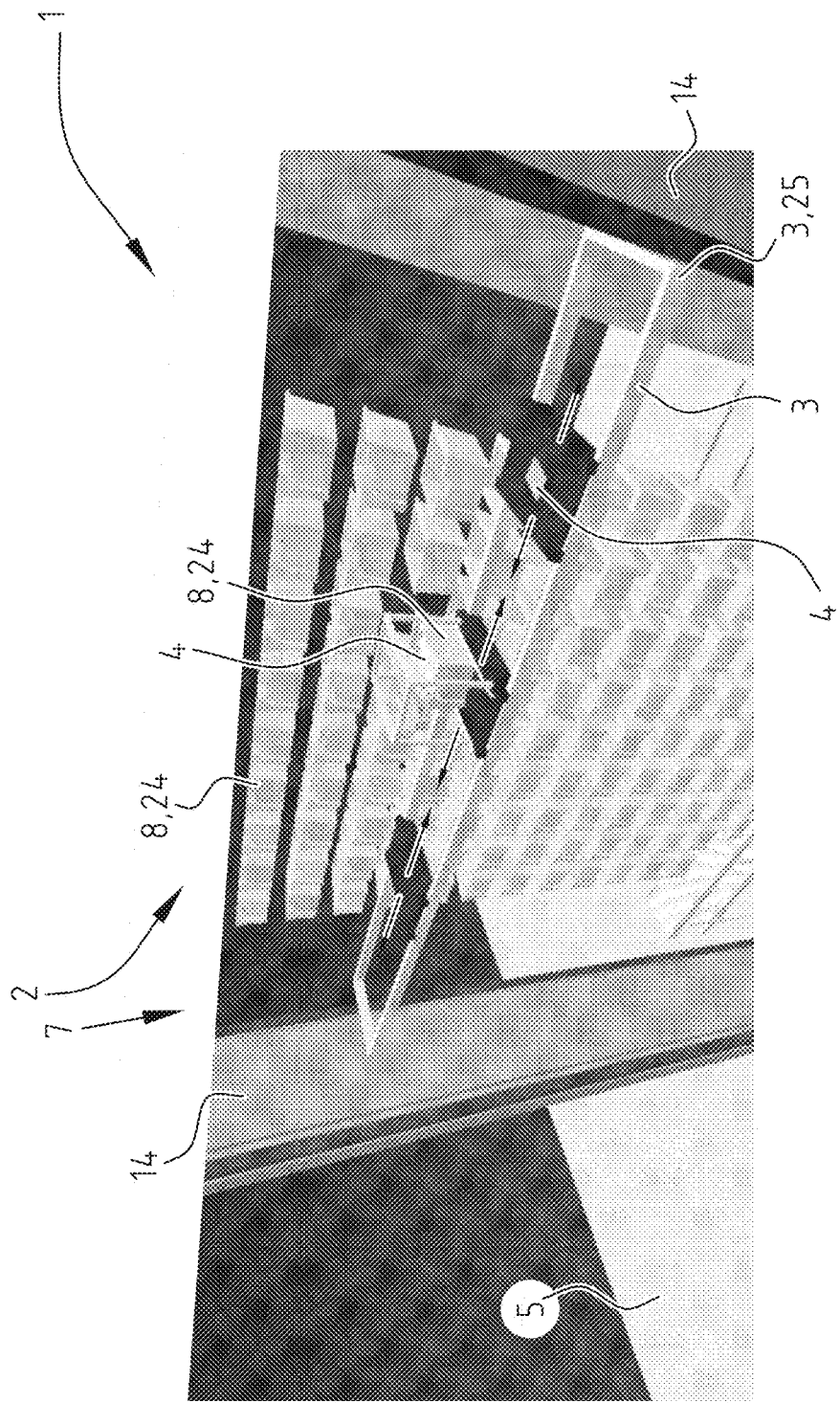
Figure 14:
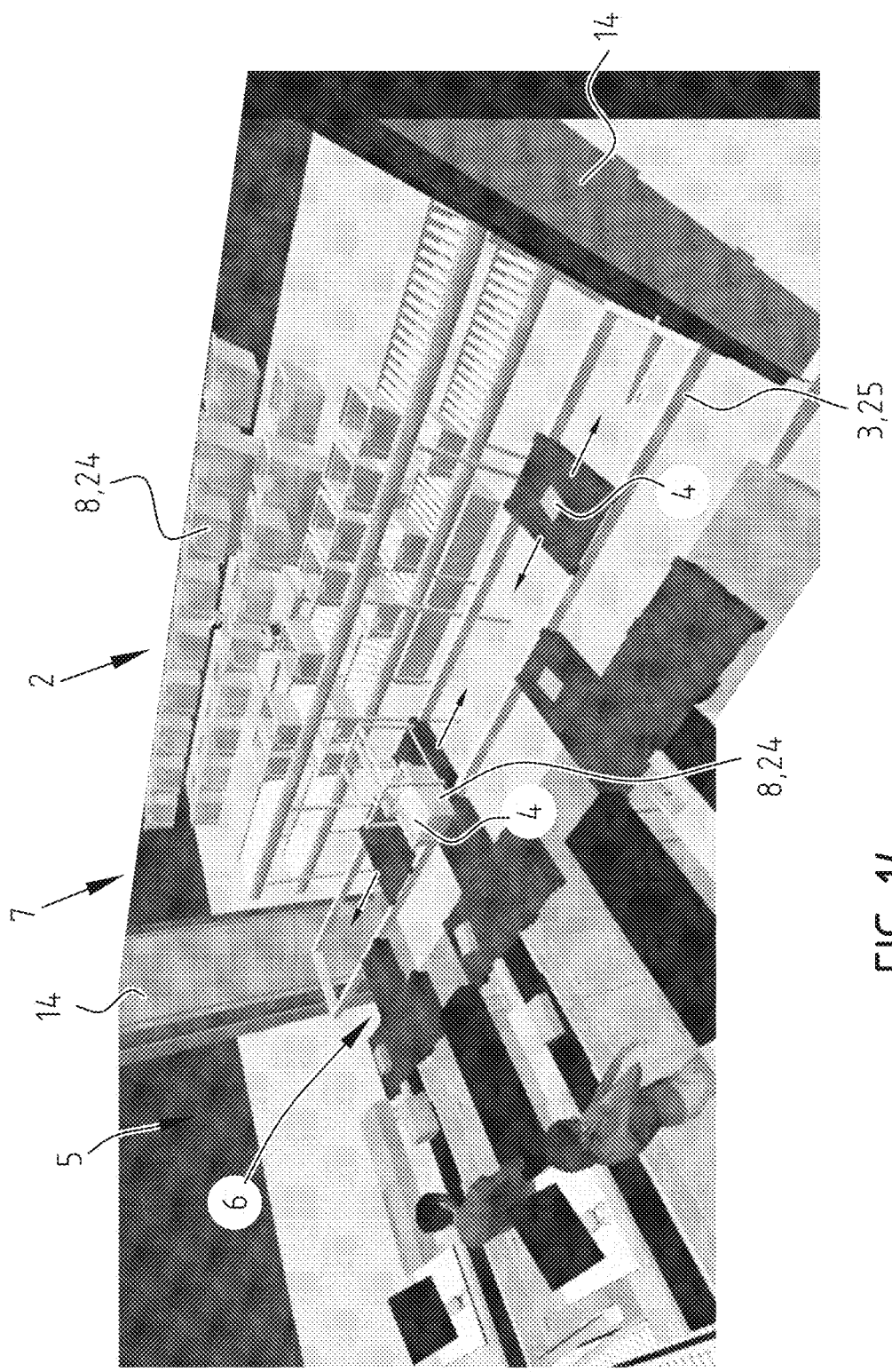

Similar to previously described embodiments, the plurality of further transporters 8, i.e. comprising the transport boxes 24 in the sixth and seventh embodiment, defines an upright matrix arrangement having rows and columns of multiple transporters 8 each, which can be best seen in FIG. 13. The upright matrix arrangement allows a system 1 to combine optimum flexibility with a limited footprint.

Figure 11:
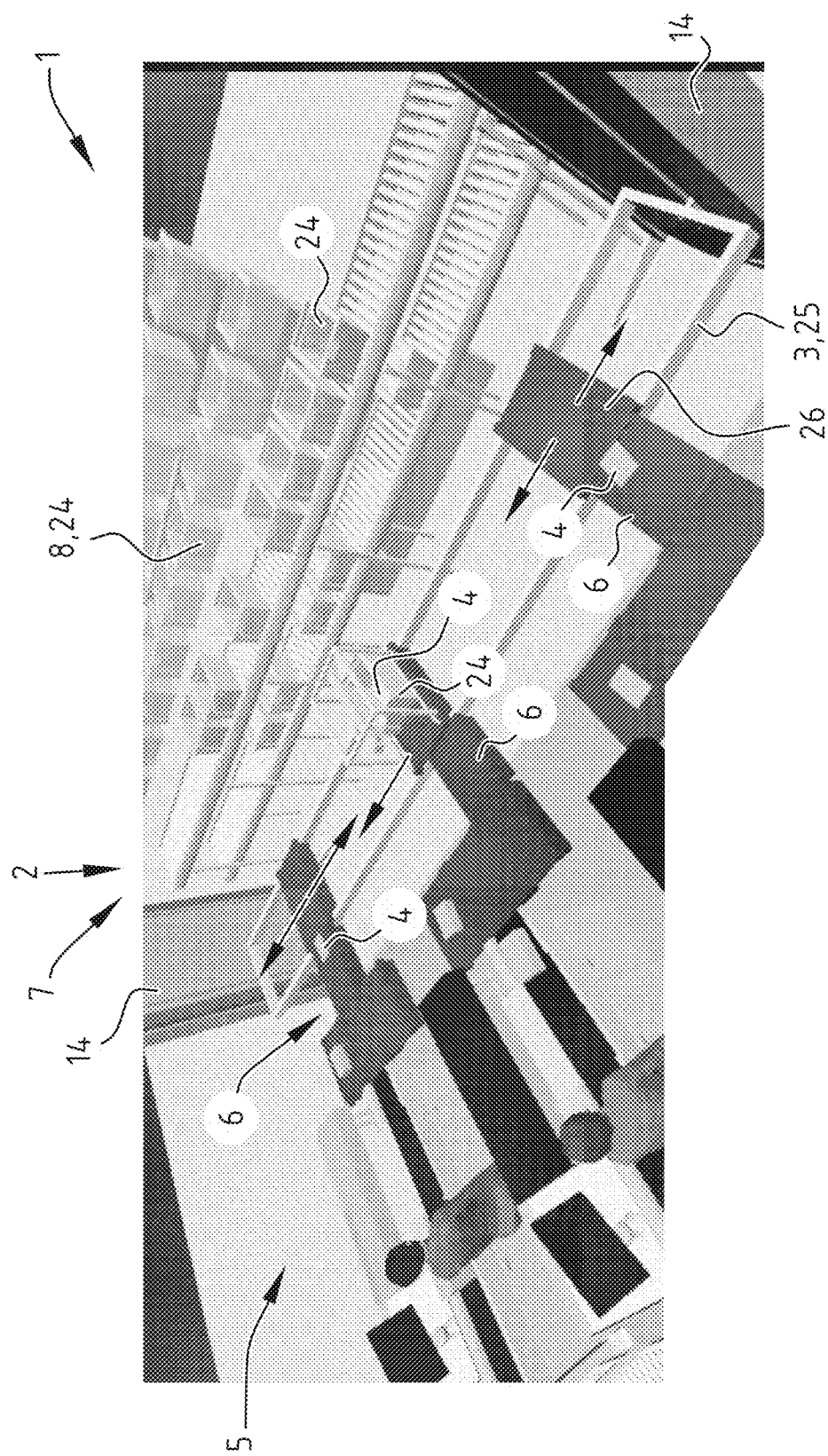
FIGS. 11-14 show perspective view of a sixth embodiment of a system in successive steps during use.

In FIG. 11, a product 4, and a transport box 24, are placed on the carrier 3, more in particular on a (belt) conveyor 21 thereof. The transport box 24 is an empty box, and may be carried by said carrier 3 to an empty place in the upright matrix arrangement.

Figure 12:
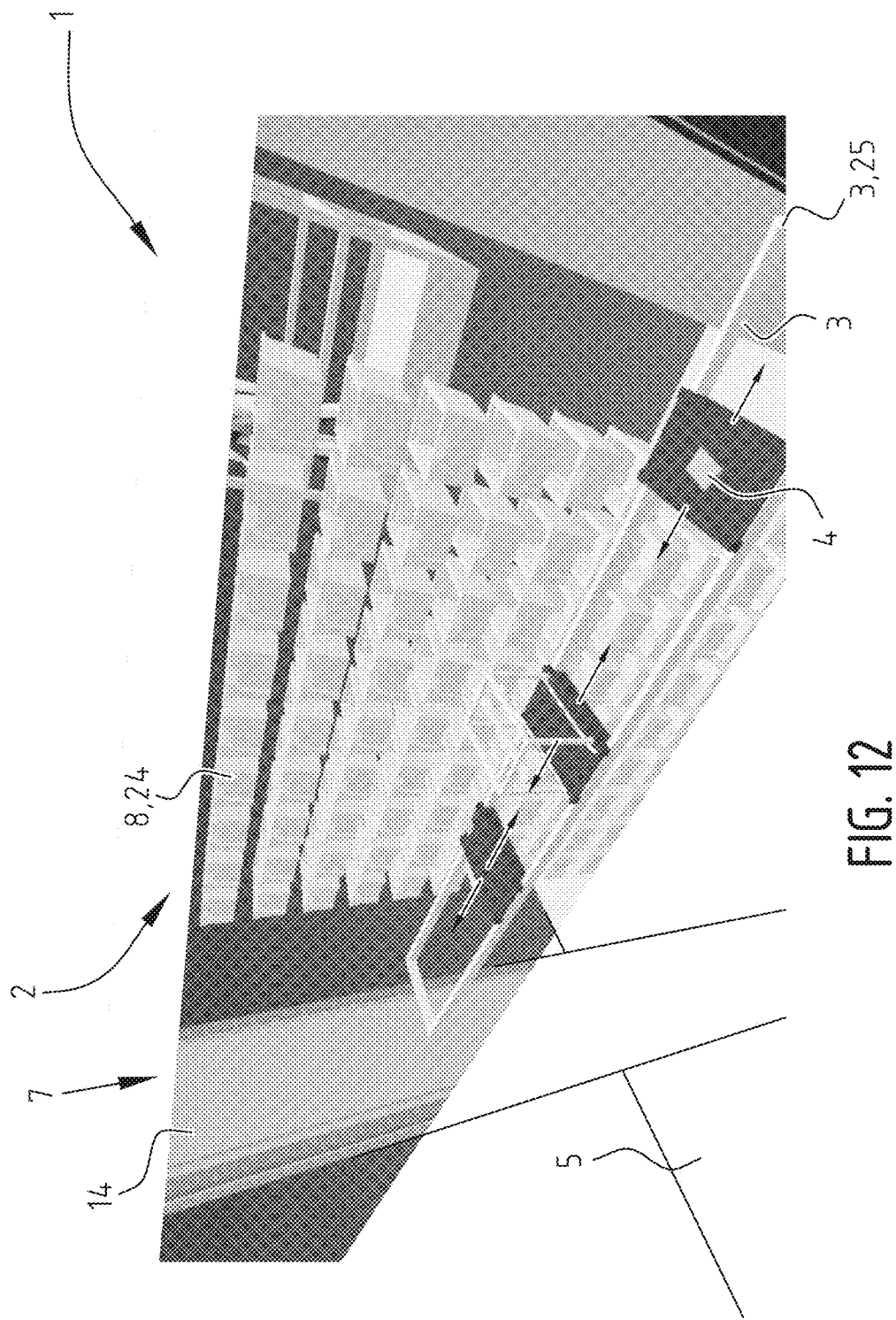

Paternoster conveyor 2 is configured to selectively place one or more than one product 4 in a pre-selected transport box 24 of the plurality of transport boxes 24 (FIG. 12). The plurality of further transporters 8 thus comprises a plurality of transport boxes 24 that are configured to receive one or more than one product 4 carried by the carrier 3, which allows the system to selectively place one or more than one product 4 in a pre-selected transport box 24 of the plurality of transport boxes 24. Over time, each transport box 24 may thus collect a plurality of products 4 that are successively placed in said respective transport box 24. In this way, at least a part of an order may be collected in a transport box 24, and once all desired products 4 are collected in the transport box 24, or if the transport box 24 is full, it is ready for further processing.

The paternoster conveyor 2 is further configured to selectively pick up (FIG. 13) and carry a pre-selected transport box 24 comprising one or more than one product 4 previously received therein. By picking up one or more than one transport box 24, an order may be completed and the system 1 may output said completed order (FIG. 14) for shipment or further processing by further (not shown) devices, such as a packing device. The empty space in the upright matrix arrangement may be filled again with an empty transport box 24 during a successive method step.

The sixth and seventh embodiment both comprise a positioner 25 configured to position one or more than one product 4 in a longitudinal direction of said carrier 3. The positioner 25 may comprise one or more than one support 26 that is displaceable in or parallel to the longitudinal direction of said carrier 3. This allows the system 1 to position one or more than one product 4 in a longitudinal direction of said carrier 3 and to reach all available spaces in the rows of upright matrix arrangement of multiple transporters 8.

In the sixth embodiment, the positioner 25 is an integral part of the carrier 3, whereas in the seventh embodiment, the positioner 25 is arranged between the at least one transporter 6 on the one side 5and the carrier 3. The shown carrier 3 comprises a plurality of (belt) conveyors 21, but is not limited thereto.

Although they show preferred embodiments of the invention, the above described embodiments are intended only to illustrate the invention and not to limit in any way the scope of the invention. The embodiments as described above relate to a sorting system, wherein products 4 that are supplied via transporter 6 may be selectively deposited on a selected one of the plurality of further transporters 8, that function as an output. It is however explicitly mentioned that the same system 1 may, if applied in a kinematic inversion relative to the described system, be applied as a combining system, wherein products 4 that are supplied via a plurality of input transporters 8 may be selectively combined on the output transporter 6. Furthermore, if a plurality of transporters 6, 8 is applied both on the one side 5 and on the opposite side 7, a very versatile system 1 that is capable of simultaneously sorting and combining products 4 is obtained. Moreover, such a versatile system 1 only requires a very limited footprint.

Also, the skilled person will understand that a transporter according to the invention may be any means suitable for transporting products, including but not limited to e.g. a belt conveyor, a roller track and a chute 23 (FIG. 10), or combinations thereof.

Accordingly, it should be understood that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments. The scope of the invention is therefore defined solely by the following claims.

The invention claimed is:

1. An order picking system, comprising:
 a paternoster conveyor having a carrier configured to carry products;
 wherein said paternoster conveyor is:
   on one side associated with at least one transporter; and
   on an opposite side associated with at least a plurality of further transporters that comprise a plurality of transport boxes,
 wherein:
 the plurality of transport boxes are configured to receive one or more than one product carried by the carrier; and
 wherein the paternoster conveyor is configured to:
   selectively place one or more than one product in a pre-selected transport box of the plurality of transport boxes; and
   selectively pick up and carry a pre-selected transport box comprising one or more than one product previously received therein.

2. The system according to claim 1, wherein the carrier of the paternoster conveyor is configured to be driveable in an endless path to selectively:
 accept products from one of the at least one transporter or at least one of the plurality of further transporters; and
 deposit said products on at least one of the plurality of further transporters or one of the at least one transporter on the other side of the paternoster conveyor.

3. The system according to claim 2, wherein the endless path is oriented substantially upright.

4. The system according to claim 1, wherein:
the paternoster conveyor comprises two opposite paternoster lifts; and
the carrier is a common carrier extending between said opposite paternoster lifts.

5. The system according to claim 1, wherein the carrier is an elongate carrier.

6. The system according to claim 1, wherein the plurality of further transporters defines an upright matrix arrangement having rows and columns of multiple transporters each.

7. The system according to claim 1, comprising a positioner configured to position one or more than one product in a longitudinal direction of said carrier.

8. The system according to claim 7, wherein the positioner comprises one or more than one support that is displaceable in or parallel to the longitudinal direction of said carrier.

9. The system according to claim 7, wherein the positioner is an integral part of the carrier.

10. The system according to claim 2, wherein said carrier is configured to:
accept products by lifting up said products from one of the at least one transporter or from at least one of the plurality of further transporters; and
deposit products by setting down said products on at least one of the plurality of further transporters or on one of the at least one transporter on the other side of the paternoster conveyor.

11. A method of handling products in an order picking system comprising at least one transporter on one side of a paternoster conveyor and at least a plurality of further transporters on an opposite side thereof, the method comprising:
accepting products from one of the at least one transporter or at least one of the plurality of further transporters;
conveying the products to the other side of the paternoster conveyor; and
depositing the products on at least one of the plurality of further transporters or one of the at least one transporter on the other side of the paternoster conveyor,
wherein:
the plurality of further transporters comprises a plurality of transport boxes that are configured to receive one or more than one product carried by the carrier, and said method comprises selectively placing one or more than one product in a pre-selected transport box of the plurality of transport boxes; and
further comprising said paternoster conveyor selectively picking up and carrying a pre-selected transport box comprising one or more than one product previously received therein.

12. The method according to claim 11, wherein the step of accepting products from one of the at least one transporter or at least one of the plurality of further transporters comprises selectively accepting products.

13. The method according to claim 11, further comprising positioning one or more than one product in a longitudinal direction of said carrier.

14. The method according to claim 11, wherein the step of accepting products from one of the at least one transporter or at least one of the plurality of further transporters comprises lifting up said products from one of the at least one transporter or at least one of the plurality of further transporters.

15. The method according to claim 11, wherein the step of depositing the products to at least one of the plurality of further transporters or one of the at least one transporter on the other side of the paternoster conveyor comprises setting down said products on at least one of the plurality of further transporters or one of the at least one transporter on the other side of the paternoster conveyor.

16. The method according to claim 11, wherein the step of depositing the products to at least one of the plurality of further transporters or one of the at least one transporter on the other side of the paternoster conveyor comprises selectively depositing products.

17. The method according to claim 11, comprising using an order picking system comprising:
a paternoster conveyor having a carrier configured to carry products;
wherein said paternoster conveyor is:
on one side associated with the at least one transporter; and
on an opposite side associated with the at least a plurality of further transporters that comprise a plurality of transport boxes,
wherein:
the plurality of transport boxes are configured to receive one or more than one product carried by the carrier; and
wherein the paternoster conveyor is configured to at least one of:
selectively place one or more than one product in a pre-selected transport box of the plurality of transport boxes; and
selectively pick up and carry a pre-selected transport box comprising one or more than one product previously received therein.

\* \* \* \* \*